US008446961B2

(12) United States Patent
Chiu et al.

(10) Patent No.: US 8,446,961 B2
(45) Date of Patent: May 21, 2013

(54) COLOR GAMUT SCALABILITY TECHNIQUES

(75) Inventors: Yi-Jen Chiu, San Jose, CA (US); Hong Jiang, El Dorado Hills, CA (US); Lidong Xu, Beijing (CN); Ya-Ti Peng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 957 days.

(21) Appl. No.: 12/283,305

(22) Filed: Sep. 11, 2008

(65) Prior Publication Data

US 2010/0008427 A1  Jan. 14, 2010

Related U.S. Application Data

(60) Provisional application No. 61/134,498, filed on Jul. 10, 2008.

(51) Int. Cl.
*H04N 11/06* (2006.01)

(52) U.S. Cl.
USPC .................................................. 375/240.18

(58) Field of Classification Search
USPC ................... 375/240.01, 240.18; 386/31, 45, 386/95
See application file for complete search history.

(56) References Cited

U.S. PATENT DOCUMENTS

| 2002/0118743 | A1 | 8/2002 | Jiang |
| 2005/0259729 | A1 | 11/2005 | Sun |
| 2007/0058183 | A1 | 3/2007 | Osaki et al. |
| 2007/0133021 | A1 | 6/2007 | Lee et al. |
| 2008/0084502 | A1* | 4/2008 | Lee et al. ...................... 348/465 |
| 2008/0284793 | A1* | 11/2008 | Young ........................... 345/604 |
| 2009/0245676 | A1 | 10/2009 | Zhu |
| 2010/0135634 | A1 | 6/2010 | Ito et al. |

FOREIGN PATENT DOCUMENTS

| CN | 1545327 A | 11/2004 |
| CN | 1972368 A | 5/2007 |
| EP | 1796372 A1 | 6/2007 |
| JP | 2006-148606 A | 6/2006 |
| WO | 2007/125697 A1 | 8/2007 |
| WO | 2007125697 A1 | 11/2007 |
| WO | 2008/077273 A1 | 7/2008 |
| WO | 2010006015 A2 | 1/2010 |
| WO | 2010/006015 A3 | 4/2010 |

OTHER PUBLICATIONS

International Preliminary Report on Patentability received for PCT Patent Application No. PCT/US2009/049884, mailed on Jan. 20, 2011, 6 pages.
International Search Report and Written Opinion received for PCT Application No. PCT/US2009/049884, mailed on Feb. 24, 2010, 11 pages.

(Continued)

*Primary Examiner* — Gilberto Barron, Jr.
*Assistant Examiner* — Malcolm Cribbs
(74) *Attorney, Agent, or Firm* — Glen Choi

(57) ABSTRACT

Techniques are described that can be used to either compress or expand video. Color compression techniques are described that can be used to compress the wide color gamut content into lower color gamut for inclusion in a baseline layer. Color expansion techniques are described that convert lower color gamut data into wider color gamut format for inclusion in an enhancement layer. Both of the baseline video stream and enhancement layer video streams may be transmitted through a channel or stored in a memory device to be viewed later. Accordingly, both baseline and enhancement video layers are available so that either lower or higher quality displays can be used to display video.

26 Claims, 5 Drawing Sheets

OTHER PUBLICATIONS

Office Action for Korean Patent Application No. 2011-7003088, mailed Feb. 27, 2012, 3 pages of English translation.

Examination Report Received for United Kingdom Patent Application No. GB1100208.6 mailed on Feb. 16, 2012, 2 pages of Office Action.

Office Action for Japanese Patent Application No. 2011-517553, mailed May 29, 2012, 4 pages of Office Action, including 2 pages of English translation.

Office Action received in Korean Patent Application No. 2011-7003088, mailed Sep. 26, 2012, 2 pages of English translation only.

Office Action received in Chinese Patent Application No. 200980131620.6, mailed Oct. 30, 2012, 16 pages of Office Action, including 9 pages of English translation.

Examination Report received in Great Britain Patent Application No. GB1100208.6, mailed Jan. 29, 2013, 2 pages.

* cited by examiner

COLOR GAMUT SCALABILITY TECHNIQUES

CROSS-REFERENCE TO RELATED APPLICATIONS

This application claims priority from U.S. Provisional Application No. 61/134,498, filed Jul. 10, 2008. This application is related to U.S. patent application Ser. No. 11/974,686, filed on Oct. 15, 2007, titled "BIT DEPTH ENHANCEMENT FOR SCALABLE VIDEO CODING."

FIELD

The subject matter disclosed herein relates generally to scalable video encoders and decoders.

RELATED ART

Scalable video codecs enable different picture quality levels to be delivered to different customers, depending on what type of video quality service customers prefer. Lower quality video services may be less expensive than higher quality video services. In a scalable video coder, a lower bit depth may be called a baseline layer and a higher bit depth may be called an enhancement layer. The greater the bit depth, the better the quality of the video.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
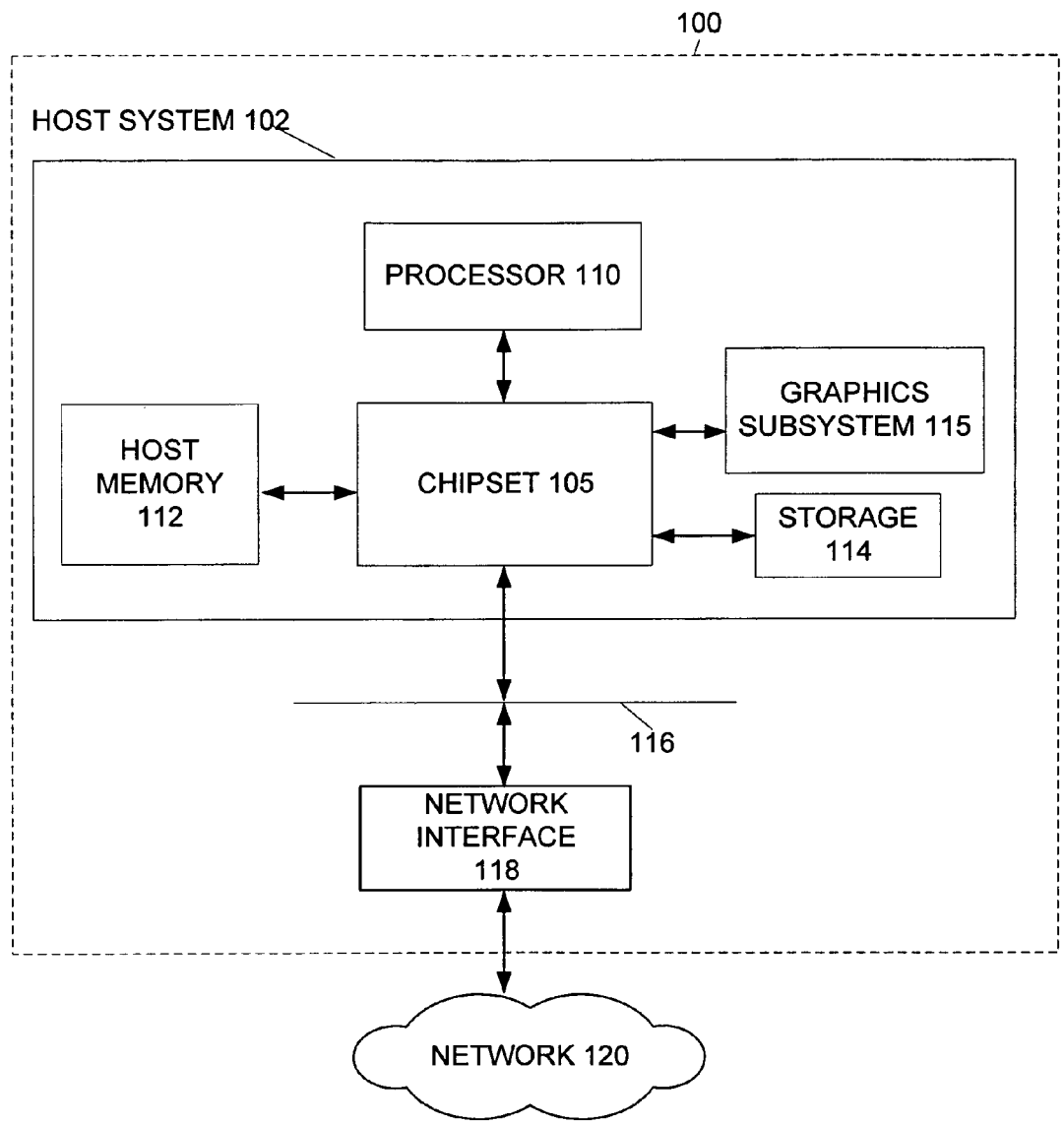
FIG. 1 depicts an example system embodiment in accordance with some embodiments of the present invention.

FIG. 1 depicts in computer system 100 a suitable system in which some embodiments of the present invention may be used. Computer system 100 may include host system 102, bus 116, and network interface 118.

Host system 102 may include chipset 105, processor 110, host memory 112, storage 114, and graphics subsystem 115. Chipset 105 may provide intercommunication among processor 110, host memory 112, storage 114, graphics subsystem 115, and bus 116. For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA).

In some embodiments, chipset 105 may include data mover logic capable of performing transfers of information within host memory 112, or between network interface 118 and host memory 112, or in general between any set of components in the computer system 100.

Processor 110 may be implemented as Complex Instruction Set Computer (CISC) or Reduced Instruction Set Computer (RISC) processors, multi-core, or any other microprocessor or central processing unit.

Host memory 112 may be implemented as a volatile memory device such as but not limited to a Random Access Memory (RAM), Dynamic Random Access Memory (DRAM), or Static RAM (SRAM).

Storage 114 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 115 may perform processing of images such as still or video for display. Graphics subsystem 115 could be integrated into processor 110 or chipset 105. Graphics subsystem 115 could be a stand-alone card communicatively coupled to chipset 105.

In one embodiment, graphics subsystem 115 may include the capability to convert wide color gamut video into low color gamut video and vice versa. Graphics subsystem 115 may transmit wide color gamut video in an enhancement layer and low color gamut video in a base line layer. Accordingly, both baseline and enhancement video layers are available so that either lower or higher quality displays can be used to display video.

Bus 116 may provide intercommunication among at least host system 102 and network interface 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network interface 118 may be capable of providing intercommunication between host system 102 and network 120 in compliance with any applicable protocols. Network interface 118 may intercommunicate with host system 102 using bus 116. In one embodiment, network interface 118 may be integrated into chipset 105. "Network interface" may include any combination of digital and/or analog hardware and/or software on an I/O (input/output) subsystem that may process one or more network protocol units to be transmitted and/or received over a network. In one embodiment, the I/O subsystem may include, for example, a network interface card (NIC), and network interface may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

Figure 2:
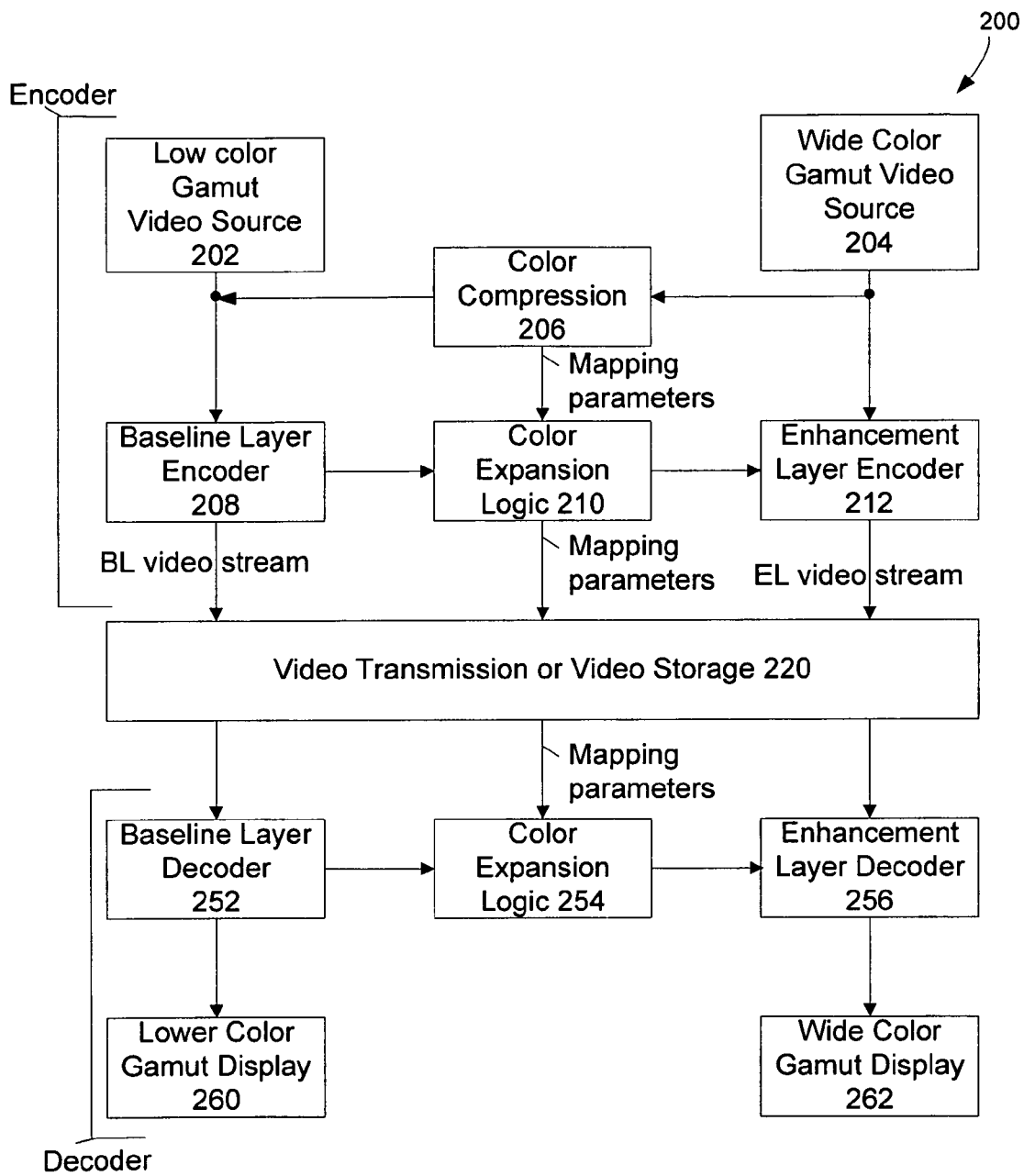
FIG. 2 depicts a video signal gamut scaler in block diagram form, in accordance with an embodiment of the present invention.

FIG. 2 depicts a video signal gamut scaler 200 in block diagram form, in accordance with an embodiment of the present invention. On the video encoder side, a lower color gamut video source 202 may provide video to baseline layer encoder 208 for encoding into a base layer. Wide color gamut video source 204 may provide video to enhancement layer encoder 212 for encoding into the enhancement layer. The wide color gamut video may use a higher bit depth format to represent video in high precision. In some cases, for example, the baseline layer may be 8 bits per pixel and the enhancement may be 10, 12, or higher bits per pixel. Color compression logic 206 may convert wide color gamut data into lower color gamut data. Color compression techniques are described that can be used to compress the wide color gamut content, such as xvYCC video at enhancement layer, into the clips of the lower color gamut to better viewed at the traditional small color gamut display such as sRGB display at baseline layer. Color compression logic 206 may transfer its mapping parameters (i.e., k value, angle (α), and white point location (w) (described with regard to FIG. 3)) to color expansion logic 210. Color expansion logic 210 may convert lower color gamut data into wider color gamut format. Both of the baseline video stream and enhancement layer video streams may be transmitted through a channel or stored in the memory device 220 to be viewed later. Color expansion techniques are presented to map the content of the lower color gamut content in a baseline layer into the clips of the wide color gamut to be viewed at an enhancement layer.

The encoder of FIG. 2 may be consistent with the H.264 (advanced video codec (AVC) and MPEG-4 Part 10), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). H.264 is designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with H.264 video coding, the present invention is not so limited. Instead, embodiments may be used in a variety of video compression systems including MPEG-2 (ISO/IEC 13818-1 (2000) MPEG-2 available from International Organization for Standardization, Geneva, Switzerland) and VC1 (SMPTE 421M (2006) available from SMPTE White Plains, N.Y. 10601).

Referring to the decoder portion of FIG. 2, the baseline video stream may be decoded by the baseline video decoder 252 into lower color gamut video to be viewed at traditional display 260, and also the decoded baseline video may be provided into color expansion logic 254 to serve as the prediction data for enhancement layer decoding. Color expansion logic 254 may apply similar color expansion techniques as those described with regard to color expansion logic 210 in order to convert lower color gamut video to higher color gamut video. Enhancement layer video decoder 256 may receive the transmitted enhancement layer video stream and the output from color expansion logic 254 to reconstruct wider color gamut video for viewing using a wide gamut display 262, such as an xvYCC video display.

Figure 3:
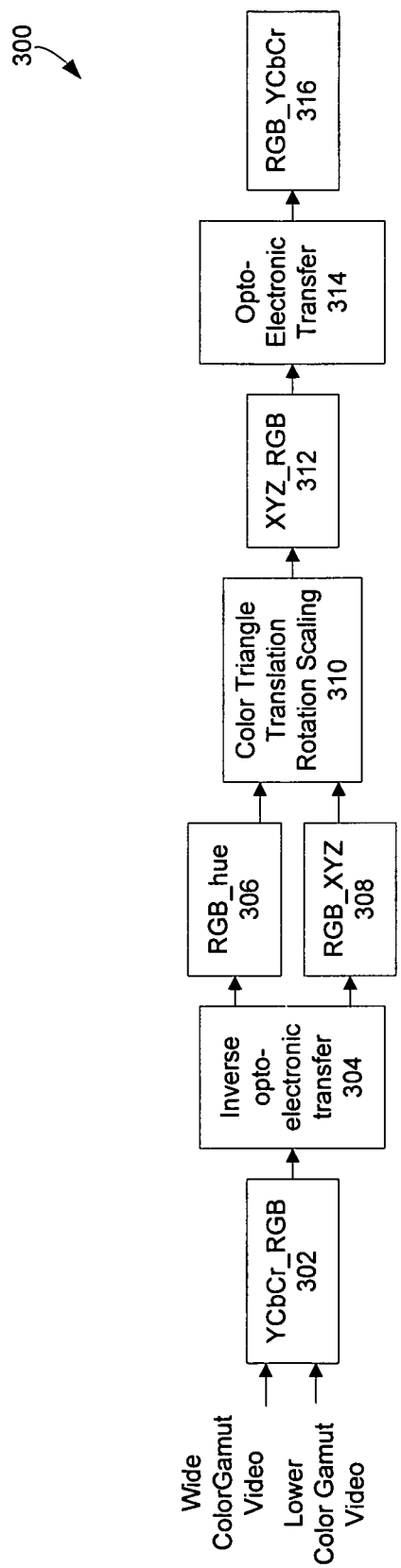
FIG. 3 depicts a color compression and expansion logic in block diagram form, in accordance with an embodiment of the present invention.

FIG. 3 depicts a block diagram of a color compression and expansion logic 300 that can be used to perform color compression or color expansion, in accordance with an embodiment of the present invention. Color compression and expansion logic 300 may receive both wide and lower color gamut video signals. For wide color gamut video signals, logic 300 may perform color compression whereas for lower color gamut video signals, logic 300 may perform color expansion.

YCbCr_RGB logic 302 may convert YCbCr format video signals to non-linear RGB format. An example transformation formula to convert YCbCr format into non-linear RGB (i.e., R'G'B') based on ITU-R Recommendation BT 709 (2002) formula is:

$$\begin{bmatrix} R' \\ G' \\ B' \end{bmatrix} = \begin{bmatrix} 1 & 0 & 1.5748 \\ 1 & -0.1873 & -0.4681 \\ 1 & 1.8556 & 0 \end{bmatrix} \begin{bmatrix} Y'_{709} \\ Cb'_{709} \\ Cr'_{709} \end{bmatrix}$$

Inverse opto-electronic transfer logic 304 may convert non-linear RGB video format into the linear RGB format. Inverse opto-electronic transfer logic 304 may use the following xvYCC conversion schemes:

$$(R, G, B) = -\left\{\frac{(R', G', B') - 0.099}{-1.099}\right\}^{\frac{1}{0.45}}, \text{ if } (R', G', B') \leq -0.081$$

$$(R, G, B) = (R', G', B')/4.50, \text{ if } -0.081 < (R', G', B') < 0.081$$

$$(R, G, B) = 1.099 \times (R', G', B')^{0.45} - 0.099, \text{ if } (R', G', B') \geq 0.081,$$

RGB_hue logic 306 may determine a hue for the RGB space. For example, the following equation can be used to determine the hue:

$$\tan(\text{hue}) = \frac{(G-B)}{2R-G-B}C,$$

where C is a constant to be specified by a user. For example, C may be the square root of 3.

For the XYZ space, the hue could be derived from the following equation:

$$\tan(\text{hue}) = \frac{y}{x}C,$$

where C is a constant to be specified by a user.
For example, C may be 9/4. Color mapping could be further improved via the color space of hue, saturation, and value, lightness, brightness, and intensity.

In some embodiments, RGB_hue logic 306 may determine hue-saturation-brightness (HSB), hue-saturation-lightness (HSL), and hue-saturation-intensity (HSI) using well known techniques.

RGB_XYZ logic 308 may convert RGB video into XYZ space using the following equation:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}$$

Note that the conversion formula here is demonstrated through xvYCC with BT 709 video signal encoding. The transform formula specified in another color space, such as ITU-R Recommendation BT.601 (2007), or the other color space, is applicable to serve for the video content created by the specific color space.

Color triangle translation rotation scaling logic 310 may perform the color mapping for color compression and color expansion. Operation of logic 310 is described with regard to FIGS. 4 and 5. For low color gamut output video, color triangle translation rotation scaling logic 310 may translate a higher bit depth (e.g., 10 or 12 bits) to a lower bit depth (e.g., 8 bits). For high color gamut output video, color triangle translation rotation scaling logic 310 may translate lower bit depth (e.g., 8 bits) to a higher bit depth (e.g., 10 or 12 bits).

XYZ_RGB logic 312 may convert color mapped XYZ pixels to linear RGB space. For example, the following Commission on Illumination (CIE) 1931 formula can be used:

$$\begin{bmatrix} R \\ G \\ B \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Opto-electronic transfer logic 314 may map linear RGB pixels to non-linear RGB. For example, for the xvYCC space, the following formula can be used:

$(R', G', B') = -1.099 \times (-R, -G, -B)^{0.45} + 0.099$, if $(R, G, B) \leq -0.018$ $(R', G', B') = 4.50 \times (R, G, B)$, if $-0.018 < (R, G, B) < 0.018$ $(R', G', B') = 1.099 \times (R, G, B)^{0.45} - 0.099$, if $(R, G, B) \geq 0.018$, RGB_YCbCr logic 316 may convert non-linear RGB to YCbCr format. The xvYCC based on BT.709 can be used to convert non-linear RGB to YCbCr format:

$$\begin{bmatrix} Y'_{709} \\ Cb'_{709} \\ Cr'_{709} \end{bmatrix} = \begin{bmatrix} 0.2126 & 0.7152 & 0.0722 \\ -0.1146 & -0.3854 & 0.5000 \\ 0.5000 & -0.4542 & 0.0458 \end{bmatrix} \begin{bmatrix} R' \\ G' \\ B' \end{bmatrix}$$

Figure 4:
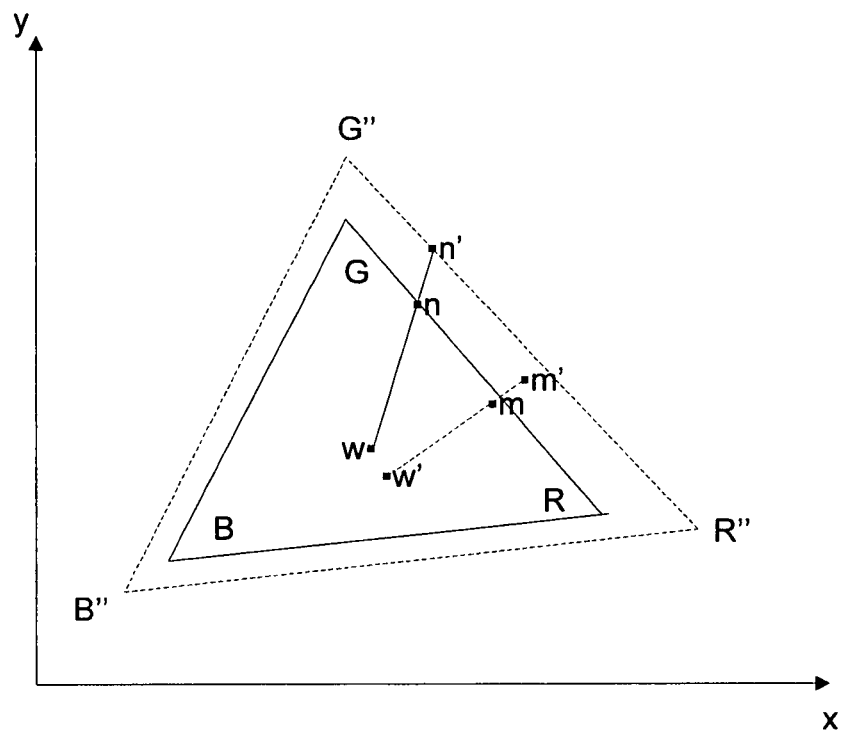
FIG. 4 depicts a typical color triangle and white point in XY space, in accordance with an embodiment of the present invention.

FIG. 4 depicts a typical color triangle with the three primary colors, red (R), green (G), blue (B), plus a white point W in XY space according to a CIE 1931 xy chromaticity diagram. The part depicted in dotted line is the color triangle with wider color gamut whereas the solid line is the color triangle with lower color gamut. Most of the color space defines the chromaticities of the red, green, and blue, and the gamut of chromaticities that can be represented as the color triangle by red, green, and blue.

To determine a translated coordinate of a pixel in a lower color gamut using information from a wider color gamut, the following technique can be used. The pixel m is in the lower color gamut whereas the pixel m' is in the wider color gamut. The pixels m and m' and white points w and w' are defined by coordinates in the XYZ space. The distance between pixel m and the white point w' of the wider color gamut is denoted as the distance(m). The mapping location of pixel m' in the wider color gamut space can be determined using k*distance(m) along the line between pixel m' and white point w', where k is an constant. Constant k could come from the ratio of a gamut percentage of a lower color gamut display to a gamut percentage of a wider color gamut display, the square root of the ratio of the area of two color triangles, or a user specified value. For example, to convert a lower color gamut pixel to a wider color gamut pixel, the constant k can be the ratio of (1) the gamut percentage of a wider color gamut display over the gamut percentage of a lower color gamut display or (2) the area of the wider color gamut color triangle over the area of the lower color gamut triangle. For example, to convert a wider color gamut pixel to a lower color gamut pixel, the constant k can be the ratio of (1) the gamut percentage of a lower color gamut display over the gamut percentage of a wider color gamut display or (2) the area of the lower color gamut color triangle over the area of the wider color gamut triangle.

To determine a translated coordinate of a pixel in a wider color gamut using information from a lower color gamut, the following technique can be used. With pixel n in the lower color gamut space, the distance between pixel n and white point w could be measured as distance(n). The mapping pixel n' in wide color gamut space can be determined using k*distance(n) from the white point w along the line between pixel n and w.

Figure 5:
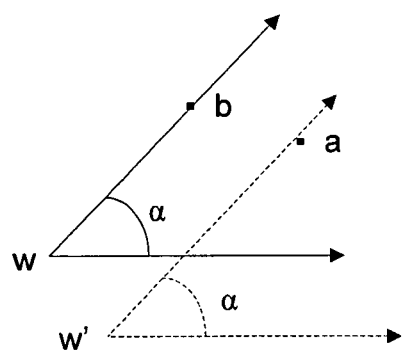
FIG. 5 depicts an operation of the color mapping in the XYZ domain with Hue angle enhancement, in accordance with an embodiment of the present invention.

FIG. 5 depicts the operation of the color mapping in XYZ domain with Hue angle enhancement. The pixels a and b and white points w and w' are defined by coordinates in the XYZ space. To determine a pixel location b in the lower gamut space based on a pixel location a in the wider gamut space, the following technique can be used. Given the pixel a in wide color gamut space, the distance between point a and the white point w' is the distance(a), and the hue angle α is determined in a similar manner as that determined by RGB_hue logic 306. The mapping location of point b in the lower gamut space may be positioned k*distance(a) from the white point w in the hue angle direction of a, where k is the constant described earlier with regard to FIG. 4.

To determine a pixel location for a lower gamut space based on pixel location in the wider gamut space, the following technique may be used. With pixel b in the lower color gamut space, the distance, distance(b), could be measured between point b and white point w, and the associated hue color angle α. The mapping point a in wide color gamut space can be derived via the angle α and the distance k*distance(b) from the white point w' in the direction of the hue angle.

Figure 6:
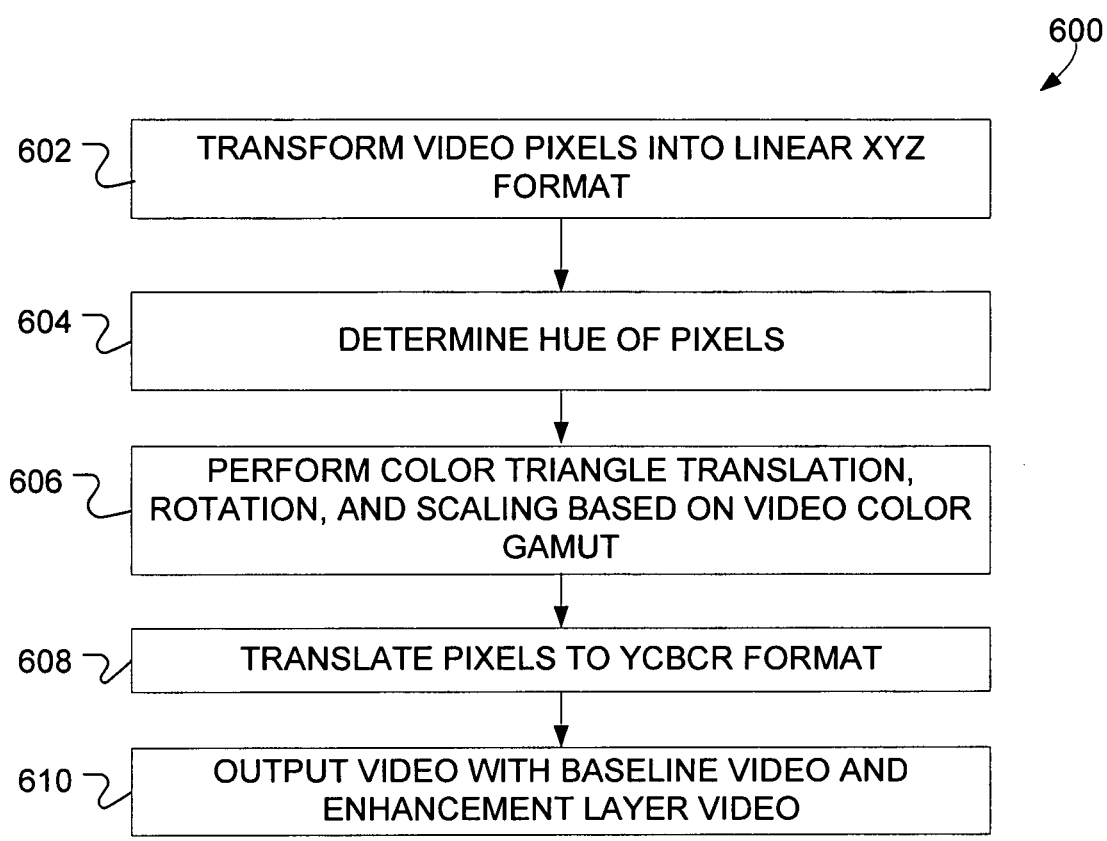
FIG. 6 depicts an example flow diagram in accordance with an embodiment of the present invention.

FIG. 6 depicts an example flow diagram in accordance with an embodiment of the present invention. Block 602 may include transforming pixels into linear XYZ format. Techniques described with regard to YCbCr_RGB logic 302, inverse opto-electronic transfer logic 304, and RGB_XYZ logic 308 (FIG. 3) may be used to transform pixels into linear XYZ format.

Block 604 may include determining a hue for the pixels. Techniques described with regard to RGB_hue logic 306 (FIG. 3) may be used to determine hue.

Block 606 may include performing color triangle translation, rotation, and scaling based for pixels on the video color gamut. For example, when input video is wide color gamut, then pixels from wide color gamut are translated to lower color gamut using color compression techniques described with regard FIGS. 4 and 5. When input video is lower color gamut, then pixels from lower color gamut are translated to wide color gamut using color expansion techniques described with regard FIGS. 4 and 5.

Block 608 may include translating pixels to YCbCr format. Techniques described with regard to XYZ_RGB logic 312, opto-electronic transfer logic 314, and RGB_YCbCr logic 316 (FIG. 3) may be used to translate pixels to YCbCr format.

Block 610 may include outputting video with baseline video and enhancement layer video. The base line video may include lower color gamut video. The lower color gamut video may have been translated from higher color gamut video at an encoder. The enhancement layer video may include higher color gamut video. The higher color gamut video may have been translated from lower color gamut video at the decoder. Accordingly, both baseline and enhancement video layers are available so that either lower or higher quality displays can be used to display video.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    transforming video from a first color gamut to a second color gamut, wherein the first color gamut comprises a wide color gamut and the second color gamut is lower color gamut than the first color gamut, wherein the transforming video comprises:
        applying color compression comprising:
            performing color space conversion from YCbCr to RGB,
            performing inverse opto-electronic transfer,
            performing color space conversion from RGB to XYZ, and
            performing color triangle transformation via translation, rotation, and scaling, and
        applying baseline layer video encoding to form baseline video based at least in part on the color compressed video; and
    providing an enhancement layer version of video based at least in part on the wide color gamut video.

2. The method of claim 1, wherein the enhancement layer includes video of higher bit depth and the baseline layer includes video of lower bit depth.

3. The method of claim 1, wherein the applying color compression further comprises:
    performing color space conversion based on RGB, hue, saturation, lightness, brightness, and intensity.

4. The method of claim 1, further comprising:
    applying color expansion to convert the video of lower color gamut into wide color gamut and
    using an enhancement layer video encoding to form the enhancement layer version of video based at least in part on the converted wide color gamut video and based at least in part on the wide color gamut video.

5. The method of claim 4, wherein the applying color expansion comprises:
    performing color space conversion from YCbCr to RGB;
    performing inverse opto-electronic transfer;
    performing color space conversion from RGB to XYZ; and
    performing color triangle transformation via translation, rotation, and scaling.

6. The method of claim 4, wherein the applying color expansion comprises:
    performing color space conversion from YCbCr to RGB;
    performing inverse opto-electronic transfer;
    performing color space conversion from RGB to XYZ; and
    performing color space conversion based on RGB, hue, saturation, lightness, brightness, and intensity; and
    performing color triangle transformation via translation, rotation, and scaling.

7. An apparatus comprising:
    color compression logic configured to translate higher gamut video to lower gamut video, wherein the color compression logic is to:
        perform color space conversion from YCbCr to RGB;
        perform inverse opto-electronic transfer;
        perform color space conversion from RGB to XYZ; and
        perform color triangle transformation via translation, rotation, and scaling;
    color expansion logic configured to translate lower gamut video to higher gamut video;
    a baseline layer encoder configured to provide baseline layer video based at least in part on the translated lower gamut video;
    an enhancement layer video encoder configured to form enhancement layer video based at least in part on the higher gamut video; and
    a memory to store the baseline and enhancement layer video.

8. The apparatus of claim 7, wherein the enhancement layer includes video of higher bit depth and the baseline layer includes video of lower bit depth.

9. The apparatus of claim 7, wherein the color compression logic is also to:
    perform color space conversion based on RGB, hue, saturation, lightness, brightness, and intensity.

10. The apparatus of claim 8, wherein the color compression logic is to:
    perform color space conversion based on RGB, hue, saturation, lightness, brightness, and intensity.

11. The apparatus of claim 7, wherein the color expansion logic is to:
perform color space conversion from YCbCr to RGB;
perform inverse opto-electronic transfer;
perform color space conversion from RGB to XYZ; and
perform color triangle transformation via translation, rotation, and scaling.

12. The apparatus of claim 8, wherein the color expansion logic is to:
perform color space conversion from YCbCr to RGB;
perform inverse opto-electronic transfer;
perform color space conversion from RGB to XYZ; and
perform color triangle transformation via translation, rotation, and scaling.

13. The apparatus of claim 7, wherein the color expansion logic is to:
perform color space conversion from YCbCr to RGB;
perform inverse opto-electronic transfer;
perform color space conversion from RGB to XYZ; and
perform color space conversion based on RGB, hue, saturation, lightness, brightness, and intensity; and
perform color triangle transformation via translation, rotation, and scaling.

14. The apparatus of claim 8, wherein the color expansion logic is to:
perform color space conversion from YCbCr to RGB;
perform inverse opto-electronic transfer;
perform color space conversion from RGB to XYZ; and
perform color space conversion based on RGB, hue, saturation, lightness, brightness, and intensity; and
perform color triangle transformation via translation, rotation, and scaling.

15. An apparatus comprising:
a memory to store video, the video including baseline layer and enhancement layer versions, wherein the memory is to store mapping parameters useful for gamut scaling from lower color gamut to a higher color gamut, wherein the mapping parameters comprise a scaling factor and an angle;
a baseline layer decoder configured to decode baseline layer video into lower color gamut video;
color expansion logic configured to convert lower color gamut video to higher color gamut video, wherein the color expansion logic is configured to convert lower color gamut video to higher color gamut video based at least in part the mapping parameters; and
an enhancement layer decoder configured to provide video based at least in part on the enhancement layer version and the converted higher color gamut video.

16. The apparatus of claim 15, wherein the enhancement layer includes video of higher bit depth and the baseline layer includes video of lower bit depth.

17. The apparatus of claim 15, wherein the color expansion logic is to:
perform color space conversion from YCbCr to RGB;
perform inverse opto-electronic transfer;
perform color space conversion from RGB to XYZ; and
perform color triangle transformation via translation, rotation, and scaling.

18. The apparatus of claim 16, wherein the color expansion logic is to:
perform color space conversion from YCbCr to RGB;
perform inverse opto-electronic transfer;
perform color space conversion from RGB to XYZ; and
perform color triangle transformation via translation, rotation, and scaling.

19. The apparatus of claim 15, wherein the color expansion logic is to:
perform color space conversion from YCbCr to RGB;
perform inverse opto-electronic transfer;
perform color space conversion from RGB to XYZ; and
perform color space conversion based on RGB, hue, saturation, lightness, brightness, and intensity; and
perform color triangle transformation via translation, rotation, and scaling.

20. The apparatus of claim 16, wherein the color expansion logic is to:
perform color space conversion from YCbCr to RGB;
perform inverse opto-electronic transfer;
perform color space conversion from RGB to XYZ; and
perform color space conversion based on RGB, hue, saturation, lightness, brightness, and intensity; and
perform color triangle transformation via translation, rotation, and scaling.

21. A system comprising:
a network interface configured to receive video;
a host system comprising a memory device, the memory device to store the video, the video including baseline layer and enhancement layer versions and the memory device is to store mapping parameters useful for gamut scaling from lower color gamut to higher color gamut, wherein the mapping parameters comprise a scaling factor and an angle;
a graphics subsystem communicatively coupled to the host system, wherein the graphics subsystem comprises:
a baseline layer decoder configured to decode baseline layer video into lower color gamut video,
color expansion logic configured to convert lower color gamut video to higher color gamut video, wherein the color expansion logic is configured to convert lower color gamut video to higher color gamut video based at least on the stored mapping parameters, and
an enhancement layer decoder configured to provide video based at least in part on the enhancement layer version and the converted higher color gamut video.

22. The system of claim 21, wherein the enhancement layer includes video of higher bit depth and the baseline layer includes video of lower bit depth.

23. The system of claim 21, wherein the color expansion logic is to:
perform color space conversion from YCbCr to RGB;
perform inverse opto-electronic transfer;
perform color space conversion from RGB to XYZ; and
perform color triangle transformation via translation, rotation, and scaling.

24. The method of claim 1, further comprising:
providing mapping parameters useful for gamut scaling from the lower color gamut to the wide color gamut, wherein the mapping parameters comprise a scaling factor and an angle.

25. The apparatus of claim 7, wherein the color expansion logic is to provide mapping parameters useful for gamut scaling from the lower color gamut to the higher color gamut, wherein the mapping parameters comprise a scaling factor and an angle.

26. The apparatus of claim 21, wherein the color expansion logic is to:
perform color space conversion from YCbCr to RGB;
perform inverse opto-electronic transfer;
perform color space conversion from RGB to XYZ; and
perform color space conversion based on RGB, hue, saturation, lightness, brightness, and intensity; and
perform color triangle transformation via translation, rotation, and scaling.

* * * * *